US006442982B1

(12) United States Patent
Larsen et al.

(10) Patent No.: US 6,442,982 B1
(45) Date of Patent: Sep. 3, 2002

(54) LOCKING DEVICE

(76) Inventors: Allan Larsen, Ramlösevej 59, Helsinge (DK), 3200; Henning Kummerfeldt, Krydservej 29, Jyllinge (DK), 4040

( * ) Notice: Subject to any disclaimer, the term of this patent is extended or adjusted under 35 U.S.C. 154(b) by 0 days.

(21) Appl. No.: 09/445,180

(22) PCT Filed: Jun. 8, 1998

(86) PCT No.: PCT/DK98/00241

§ 371 (c)(1),
(2), (4) Date: Dec. 8, 1999

(87) PCT Pub. No.: WO98/57018

PCT Pub. Date: Dec. 17, 1998

(30) Foreign Application Priority Data

Jun. 9, 1997 (DK) .............................................. 0671/97

(51) Int. Cl.[7] ................................................ B60R 25/02

(52) U.S. Cl. ....................... 70/3; 70/34; 70/56; 70/211; 292/207; 292/218; 292/283; 292/DIG. 32

(58) Field of Search ........................ 70/2, 3, 34, 54–56, 70/181, 211, 212; 292/218, DIG. 32, 281–284, 327–329, 205, 207, 208

(56) References Cited

U.S. PATENT DOCUMENTS

| | | | | |
|---|---|---|---|---|
| 1,542,016 A | 6/1925 | Stull | | |
| 4,057,273 A | 11/1977 | Carr | ........................... | 292/218 |
| 4,627,248 A | 12/1986 | Haworth | ...................... | 70/134 |
| 4,690,442 A | 9/1987 | Reynard | ..................... | 292/218 |

FOREIGN PATENT DOCUMENTS

| | | |
|---|---|---|
| FR | 2725230 | 4/1996 |
| GB | 1379613 | 1/1975 |
| GB | 2228526 | 8/1990 |
| GB | 2250541 | 6/1992 |
| GB | 2295417 | 5/1996 |
| WO | WO 98/57018 | 12/1998 |

*Primary Examiner*—Lloyd A. Gall
(74) *Attorney, Agent, or Firm*—Pennie & Edmonds LLP

(57) ABSTRACT

A locking device (10) is serving for, with a lock (18), locking an already closed door (4) which is mounted with hinges (6) on a frame (5) in a gable (3) of a container (1). The door is held in the closed position by a turnable locking bar (7) which, at least at one end, has a projection for, by turning the bar, engaging it with a holder on the frame. The locking device (10) furthermore comprises a lock hole (25) running through the locking bar (7), the lock hole (25) assumes, in the closed position, a direction mainly parallel to the door plane; a house (11) with a channel (12) attached to the door, the channel (12) encloses the locking bar (7), and a bolt guide (22) which is in alignment with the lock hole (25) in the closed position; and a sliding bolt (23) for sliding through the bolt guide (22) and the lock hole (25) and locking the locking device (10) with a lock (37) which engage with tumblers (27) in the lock (18). A combination lock can advantageously be used as lock. The locking device provides protection against burglary and spares you the trouble of keys if the lock is a combination lock.

23 Claims, 4 Drawing Sheets

LOCKING DEVICE

FIELD OF THE INVENTION

The invention concerns a locking device for, with a lock, locking an already closed door which is mounted with hinges on a frame in a wall and is held in closed position by a turnable locking bar which, at least at one end, has a projection for, by rotating the bar, engaging with a holder on the frame.

BACKGROUND OF THE INVENTION

Trucks with closed compartments and containers are normally provided with a double wing door which is placed in one of the end walls in order to facilitate loading and unloading. The doors are swingably hinged on a frame in the end wall, and at least one of the doors is held in closed position by a locking bar which is rotatably journaled in a number of brackets on the door and having a handle for rotating a projection at each end of the bar into engagement with corresponding holders on the frame. In this position, the handle can be locked to a lock fitting on the door with e.g. a padlock to secure against theft. However, in many cases, the container is merely sealed with a seal which is broken and subsequently replaced with a new seal at e.g. customs checks.

However, the doors of this known structure can relatively easily and quickly be broken open by e.g. sawing through the handle or breaking this and the lock fittings to pieces. Another disadvantage is the fact that the lock requires keys which must be brought along or be at the customs station and at the recipient. This is a considerable problem considering the very large number of e.g. containers that are today circulating all over the world, and which in fact require the presence of a corresponding number of keys and a complicated system for storing and keeping the keys in order.

SUMMARY OF THE INVENTION

The object of the invention is to show a locking device of the kind mentioned in the opening paragraph that provides a better guarantee against burglary than known so far.

Another object of the invention is to show a locking device of the kind mentioned in the opening paragraph that can function independently of keys.

The novel and unique features according to the invention are the fact that the locking device comprises a lock hole running through the locking bar, the lock hole assumes, in the closed position, a direction mainly parallel to the door plane, a house with a channel attached on the door, the channel encloses the locking bar, and a bolt guide which is in alignment with the lock hole in the closed position; and a sliding bolt for sliding through the bolt guide and the lock hole and locking the locking device by means of locking means which engage with tumblers in the lock. Thereby, an effective, burglary-proof construction is obtained in a simple manner.

Owing to consideration of space and strength the house can have an opening on one side of the channel for taking up the lock whereas the bolt guide is made on the other side so that the bolt is supported on both sides of the lock hole.

The bolt can furthermore have a head for preventing lock and bolt from being pulled out of the house in locked condition.

In a simple, inexpensive embodiment, one of the brackets of the locking bar can be used as house. On each side of the channel enclosing the locking bar, the bracket is provided with a sleeve for taking up the lock and a bush, respectively, containing the bolt guide.

By placing the bracket immediately against the holder of the frame for, by rotating the locking bar, retaining the projection of this bar, the advantage is obtained in that it is only possible for any unauthorised person to saw over or cut the locking bar above the bracket. However, the rest of the bar is still engaged with the locking device which thereby still locks the door securely.

In an especially advantageous embodiment, the lock can be a combination lock whereby the previous need for having a large number of keys is eliminated. The code can quickly and easily be communicated by e.g. telephone, and the combination lock can quickly be replaced or recoded if necessary.

The combination lock can have annular tumblers with radially inwards turned tumbler keys, and the locking means of the bolt can at the same time be made of a number of encircling grooves for taking up the tumbler keys in locked condition, a longitudinal free mortise for taking up the tumbler keys in unlocked condition, and a pawl placed in the house and engaging with the free mortise for controlling the angular position of the bolt in relation to the lock.

Even if a door is already locked by a lock, it still is often demanded that it is sealed with a seal which is broken and then replaced with a new seal at e.g. customs checks.

In one variant of the locking device according to the invention, the sliding bolt can advantageously be made as a seal. In that case, the free mortise then ends blindly in the bolt, and the pawl engages with the slot at a distance from the free end of the bolt. When the lock is unlocked, the bolt is then pushed off in the direction opposite of the lock by a prestressed compression spring in the house until the pawl hits the end of the mortise and the head projects from the house. In this position, the customs service can now e.g. cut or saw over the head which then can be pulled free of the lock hole of the locking bar by pulling on the lock so that the door can be opened.

The head of the bolt is easiest to remove when there is an encircling groove under the head. The groove must be so deep that the head can easily be knocked or broken off.

A second variant according to the invention can be made for the use of a conventional seal. In that case, the house has a sealing hole extending transversely to the bolt guide and serving for mounting of the seal. In this case, the free mortise can end at the terminal surface of the bolt so that the bolt can be pulled free of the lock hole when the seal is broken and the lock can be unlocked.

BRIEF DESCRIPTION OF THE DRAWINGS

The invention will be explained in greater detail below, describing only exemplary embodiments with reference to the drawing, in which.

DETAILED DESCRIPTION OF THE INVENTION

Figure 1:
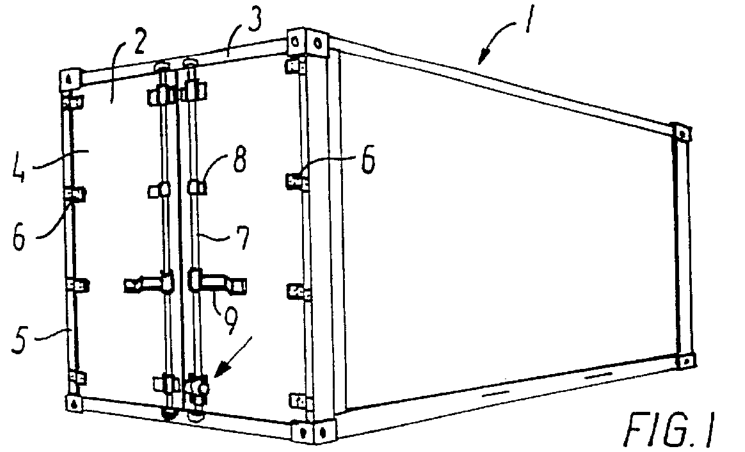
FIG. 1 is a perspective view of a container with two side-hinged doors to be locked with a locking device according to the invention.

FIG. 1 shows a container 1 for transporting goods. A very large part of the goods that are carried by truck, rail, and ship both nationally and internationally are today transported in such containers of which there therefore are a very large and ever-increasing number.

Owing to consideration of space the containers are stacked on top of each other and side by side during storage and e.g. on ships. The opening 2 for loading and unloading and for obtaining access to the container is therefore suitably placed at the gable end 3 of the container.

In the shown case, the opening 2 can be closed by two doors 4 each swingably mounted on the vertical sides of the frame 5 of the opening by means of hinges 6. Each door furthermore has a locking bar 7 rotatably journaled in brackets 8 on the face of the respective door and which can be rotated by means of a handle 9. Projections for, by rotating the bar 7 with a handle 9, engaging with locking fittings at the top and bottom of the frame are provided at the end of each bar 7. This detail is prior art and is only hinted in FIG. 1.

In FIG. 1, both locking bars 7 are turned into their locked position, and the opening 2 is thereby effectively closed. However, the doors 4 can without any fuss be opened by unauthorised persons who want to force their way into the container to take possession of its content. To secure the container against burglary, it is in most cases demanded that the doors also have to be securely locked, and if the container is to cross a customs frontier, it must be sealed with a seal.

In FIG. 1, one of the doors 4 is, as indicated by the arrow, locked with a locking device according to the invention, while the other door is held locked by engagement with the first locked door. The locking device indicated in full by the reference numeral 10 is shown in a perspective, exploded view in FIG. 2.

The locking device is built up around a house 11 which is shaped with the same basic form as the brackets 8 and, as shown, made of a plate of e.g. galvanised iron and forms a U-shaped channel 12 for rotatably journaling of the locking bar, and a mounting web 13 on each side of the channel with screw holes 14 for screwing the house on the face of the door. In this case, the house further comprises aback plate 15 forming a bearing bush 16 for the locking bar 7 at the opening of the U-shaped channel 12.

Figure 2:
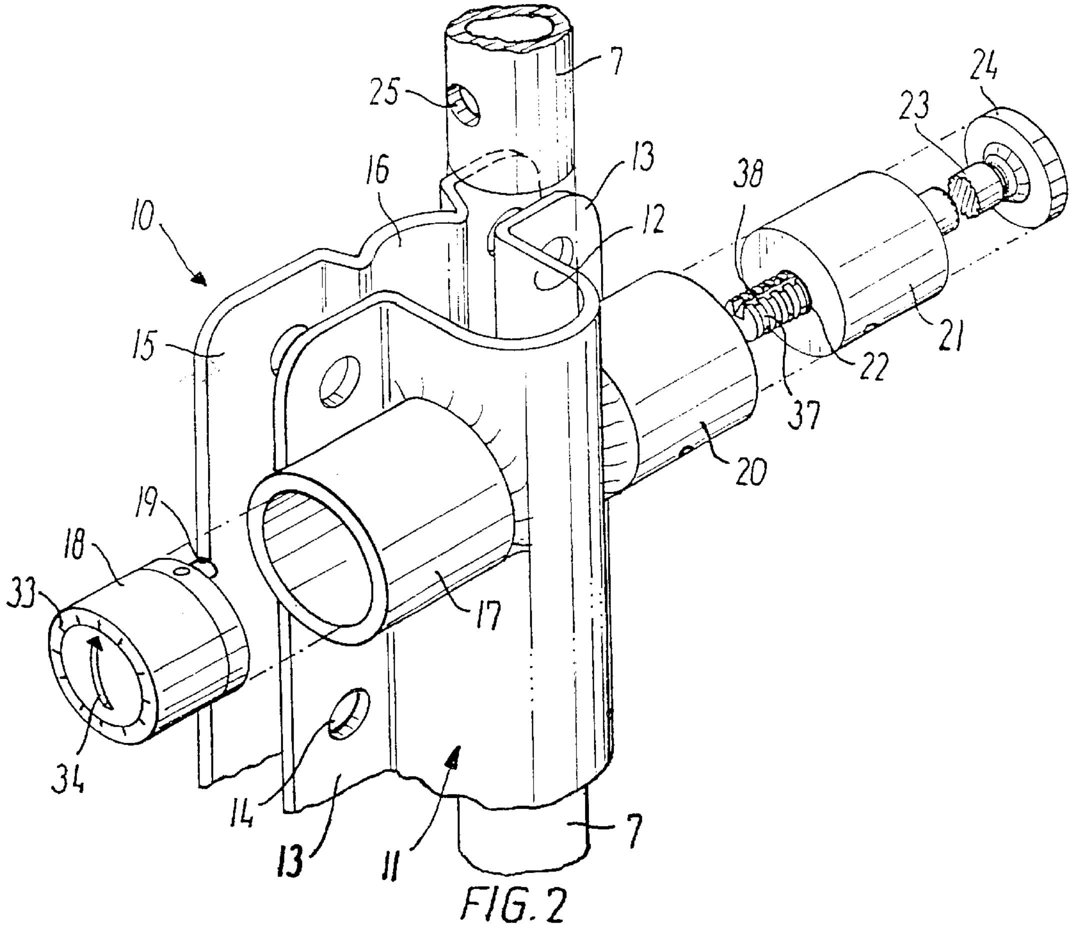
FIG. 2 is on a larger scale a perspective, exploded view of the locking device shown in FIG. 1.

As shown in FIG. 2, a first sleeve 17 is placed on the left side of the channel 12 for taking up a combination lock 18 with a pin 19 for, by engagement with a hole (not shown) in the house, preventing the lock from rotating in the sleeve. On the other side of the channel, a second sleeve 20 is placed for taking up a bush 21 with a guide 22 for a sliding bolt 23 with a head 24. In the locking bar 7, there is furthermore a lock hole 25 which is in alignment with the bolt guide 22 when the bar 7 is in its locked position.

Figure 3:
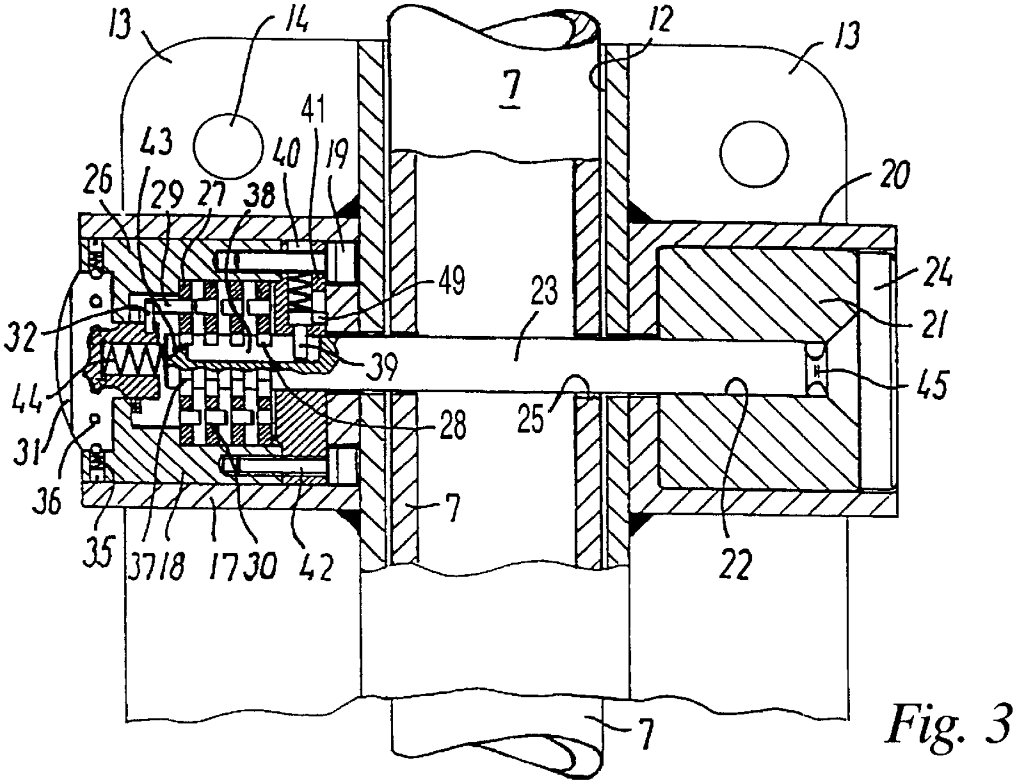
FIG. 3 is a partly sectional view of a first embodiment of a locking device according to the invention in locked position.
Figure 4:
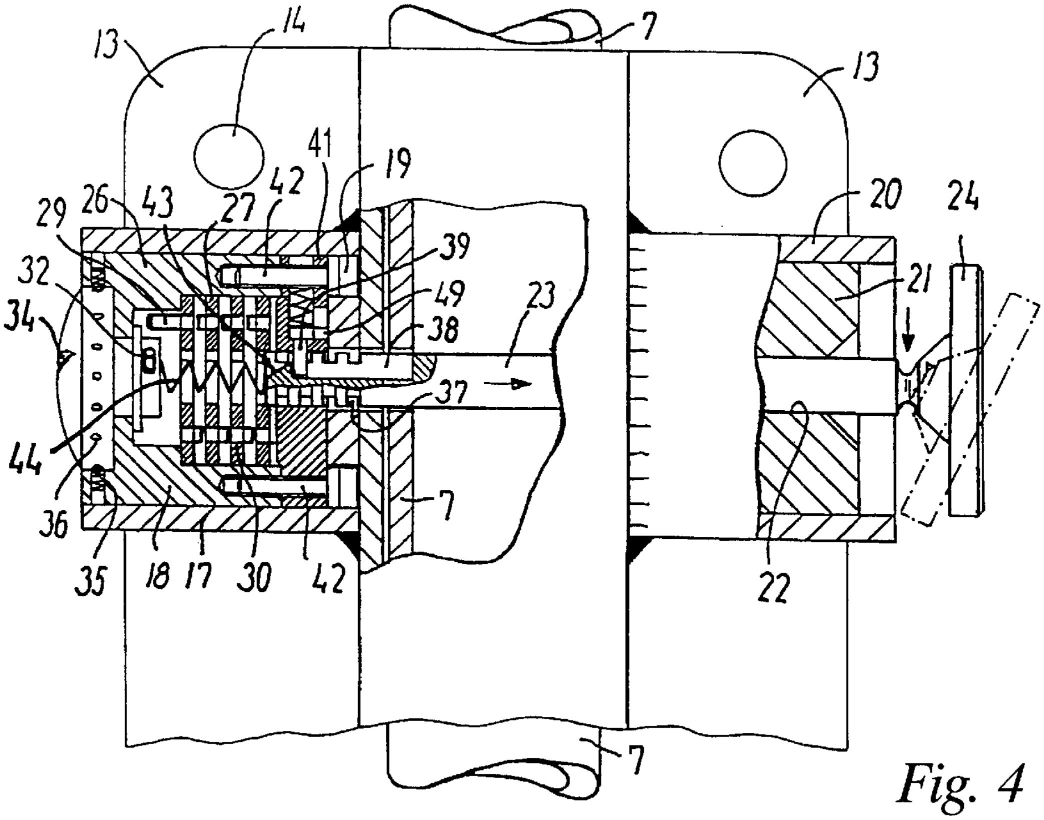
FIG. 4 is the same in unlocked position.

FIGS. 3 and 4 show in detail and partly in section how the construction in FIG. 2 is arranged. The sliding bolt 23 is now pushed into the guide 22, the lock hole 25 and into the combination lock 18 while its head 24 abuts on the outer terminal surface of the bush 21.

The combination lock 18, which is known per se, has a cylinder 26 with four annular tumblers 27 each having a radially inwards turned tumbler key 28. The lock is coded by pins 29 which are put in holes 30 placed at equidistant angular distances in each of the tumblers.

The tumblers 27 can be rotated by means of a turnable knob 31 with a pin 32 for engaging with the first pin 29 of the tumbler. As it can be seen best in FIG. 2, there is a scale 33 on the face of the combination lock 18, and by successively turning the knob 31 in accordance with the preset code, the tumbler keys 28 will finally be in alignment with each other.

The knob 31 can e.g. be turned by means of a coin interlocking with a slot 34 on the face of the knob and which furthermore functions as an indicator for indicating the actual code position. For ensuring a precise setting of the code, there are spring-loaded snap dowels 35 which spring into recesses 36 along the circumference of the knob at the correct code positions.

The free end of the sliding bolt 23 has encircling grooves 37 for taking up the tumbler keys 28 of the tumbler rings in the locked position. Furthermore, the sliding bolt has a longitudinal mortise 38 for taking up the tumbler keys when they in use have been made to be in alignment by the right code. A spring-loaded pawl 39 placed in a hole 40 in a back piece 41 is extending into the mortise 38 and thereby ensuring the bolt from turning in relation to the lock. The back piece is screwed upon the lock cylinder by means of screws 42.

At the end and opposite the mortise 38, the bolt has a bevelling 43 for lifting the pawl when the bolt is pushed into the lock after which the spring-loaded pawl springs into the mortise by itself.

In FIG. 3, the locking device is locked. The tumbler keys 28, or at least some of them, are in the encircling grooves 37 of the bolt 23. The bolt can therefore not be pulled out of the lock via the second sleeve 20. Furthermore, the head 24 of the bolt ensures that the lock with the locked bolt cannot be pulled out the other way either via the first sleeve 17. Since the bolt 23, as shown, is extending through the lock hole 25 and is securely fastened on both sides of this, it is not possible to rotate the locking bar 7 out of its locked position. The door is securely and effectively locked.

In FIG. 4, the lock is unlocked. The tumbler keys are now in alignment with each other and are all in the mortise 38 which therefore allows the bolt to travel a distance in the direction of the arrow until the pawl 39 hit the end of the mortise 38. At this point, the head 24 of the bolt 23 projects from the house 11 so that it can be sawn or cut off with a bolt cutter (not shown). Under the head, an encircling groove 45 is made that weakens the bolt on this spot and functions as a break indicator which also makes it possible to break or knock off the head. The lock 18 can now be pulled out of the house via the first sleeve 17 and thereby out of the lock hole 25 together with the bolt 23 after which the locking bar 7 can be turned out of its locked position and the door can be opened.

After having been pulled out of the house 11, the broken bolt 23 is still connected to the lock 18 as a result of the engagement between the pawl 39 and the mortise 38. In order to be able to separate the two parts, a cross-pin 49 can therefore be placed on the pawl for lifting the pawl from the mortise so that the broken bolt can be pulled out of the lock which then can be reused.

As shown, the bolt functions, in this embodiment, advantageously as a seal which can be broken by e.g. the customs service in order to obtain access to the container.

Figure 5:
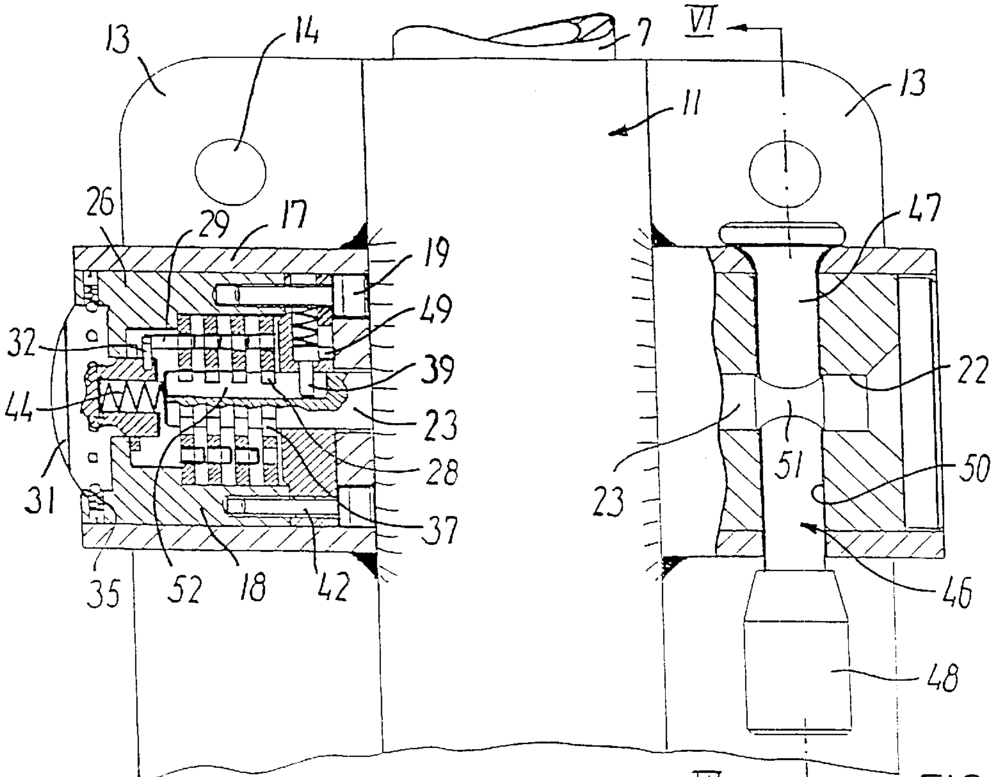
FIG. 5 is a partly sectional view of a second embodiment of a locking device according to the invention with a bolt seal.
Figure 6:
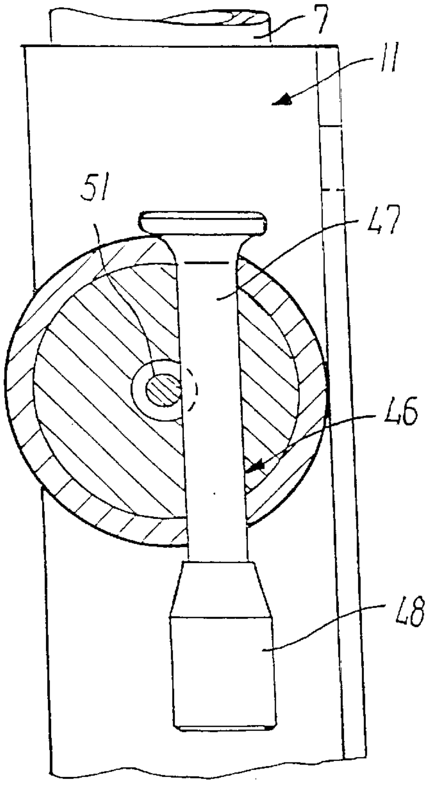
FIG. 6 is a sectional view taken along the line VI—VI of FIG. 5.
Figure 7:
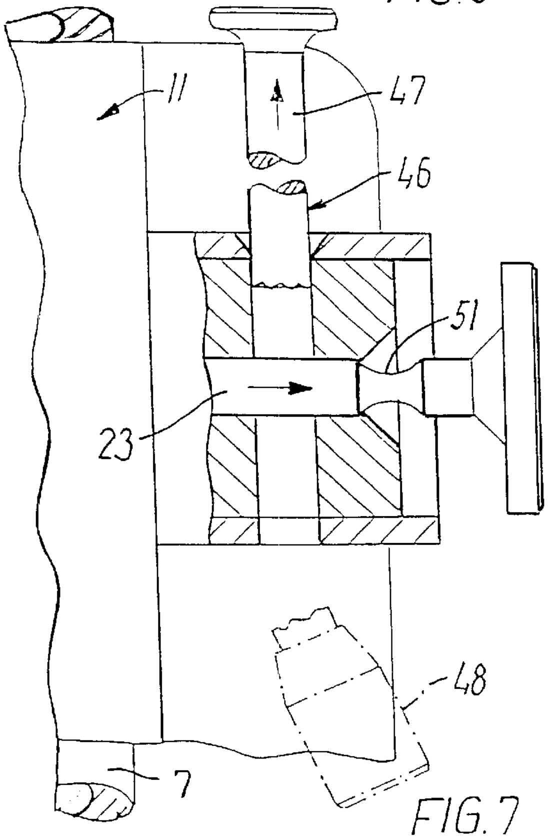
FIG. 7 is a fractional view of the locking device shown in FIG. 5 with broken seal.

FIGS. 5, 6, and 7 show a second embodiment of the locking device according to the invention. This construction is provided with a separate bolt seal 46 but besides this, it corresponds to the construction shown in FIGS. 3 and 4 and will therefore not be described any further. Corresponding components are similarly referenced.

The bolt seal is comprised of two parts 47, 48 for being pushed together from each side of a sealing hole 50 and joined irreversibly. The sealing hole 50 is extending transversely to the bolt hole and is intersecting this. In order to make room for the seal, the bolt furthermore has an encircling groove 51.

When the bolt seal 46 is in the sealing hole 50, as shown in FIGS. 5 and 6, it engages with the groove 51 in the bolt 23 which therefore cannot be pulled out of the house via the second sleeve 20. On account of the presence of the head 24, the bolt cannot be pulled out together with the lock 18 via the first sleeve 17 either. In this embodiment, it is therefore not possible to turn the locking bar 7 out of its locked position either, and the door is therefore securely and effectively locked.

In FIG. 7, the customs service has now broken the seal 46 by means of e.g. a bolt cutter (not shown) and has removed it from the engagement with the groove 51 of the bolt after which the prestressed compression spring 44 is able to push the bolt outwards towards the second sleeve 20. In this case, the mortise 52 is extending to the free terminal surface of the bolt 23, and the pawl 39 can therefore not prevent the bolt from being pulled out of the lock hole 25 of the locking bar 7 so that the locking bar can be turned out of its locked position and the door can be opened.

Figure 8:
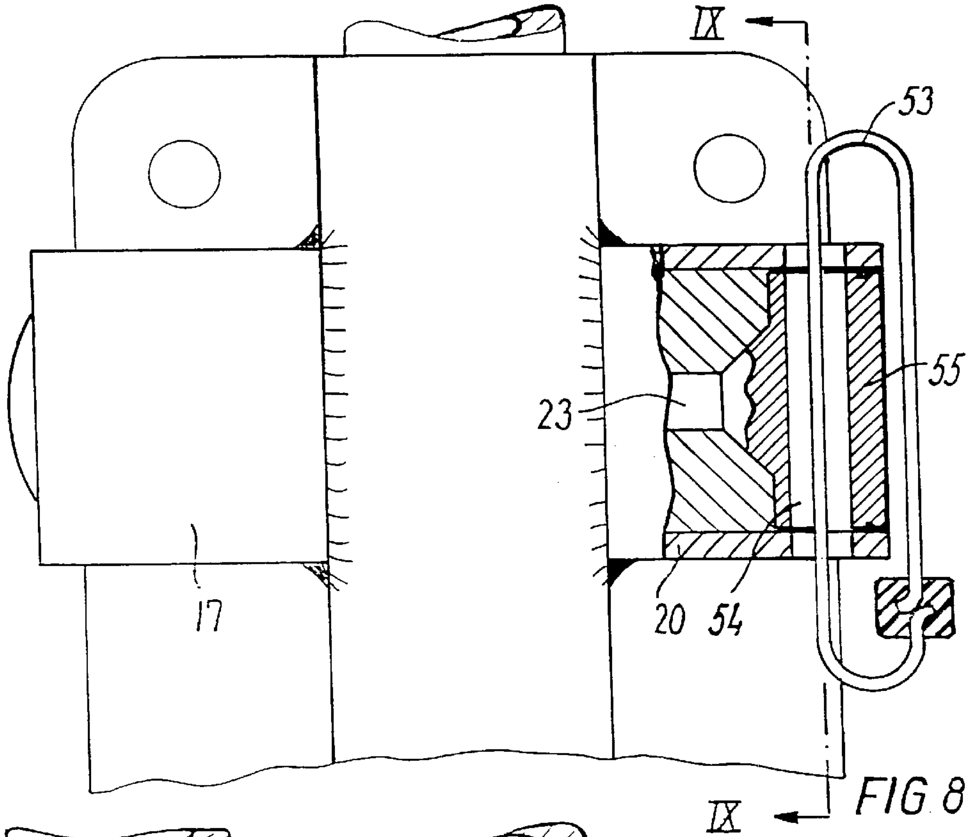
FIG. 8 is a partly sectional view of a third embodiment of a locking device according to the invention with a band seal.
Figure 9:
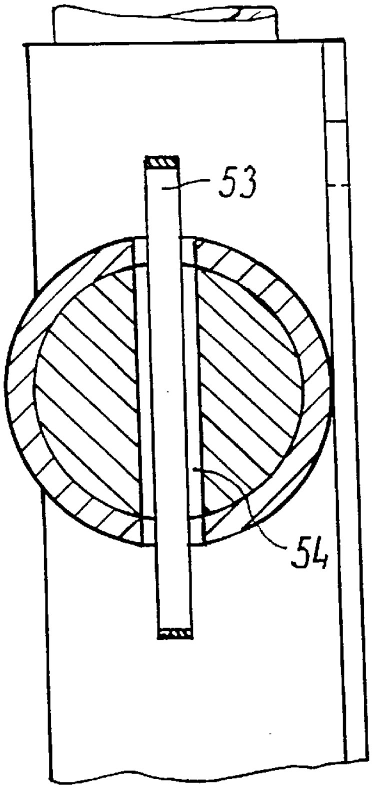
FIG. 9 is a sectional view taken along the line IX—IX of FIG. 8.
Figure 10:
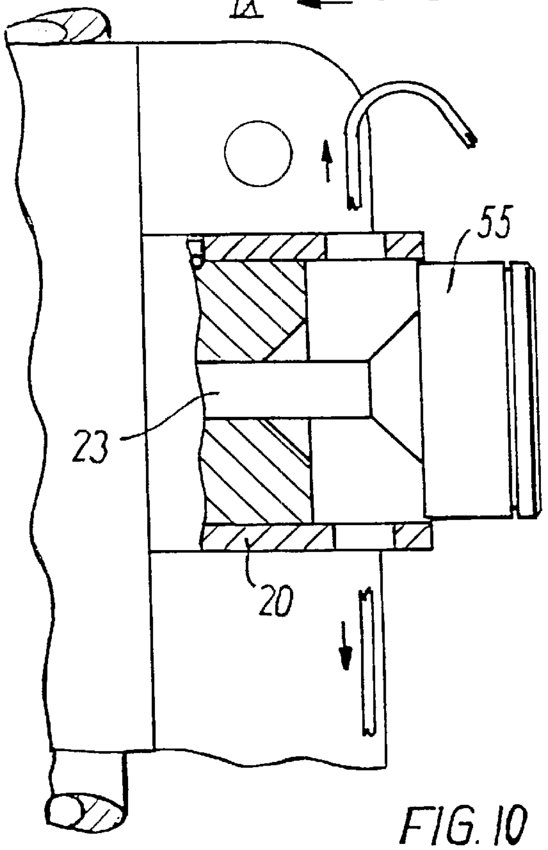
FIG. 10 is a fractional view of the locking device shown in FIG. 8 with a broken seal.

FIGS. 8, 9, and 10 show a third embodiment of the locking device according to the invention. In this embodiment, the seal shown in FIGS. 5, 6, and 7 is replaced by a band seal 53 of a known kind, and the sealing hole 54 is made through the head 55 of the bolt but besides this, the construction is the same and will therefore not be described in detail once more. Corresponding components are similarly referenced.

The locking bar 7 is weakened the least if the lock hole 25 is small. On the other hand, this means that the bolt will be relatively weak. An optimal balance between these two conflicting considerations is obtained if the bolt has a round cross section with a diameter of between 0.7 and 0.05, preferably between 0.6 and 0.1, and especially between 0.5 and 0.2 times the diameter of the locking bar.

The invention is described above and shown in the drawing by way of example on the assumption that the locking device is used for locking a container. It goes without saying that the locking device can just as well be used on all other kinds of doors which are held in the closed position by a locking bar. In this way, it applies to compartment doors of trucks but also doors in buildings in which case the locking bar does not have to be turnable but can be displaceable as e.g. is the case with a cremone rod.

What is claimed is:

1. A locking device (10) with a lock (18), for locking an already closed door (4) which is mounted with hinges (6) on a frame (5) in a wall and is held in the closed position by a locking bar (7) which at least at one end, has a projection for engaging the bar with a holder on the frame, wherein the locking device (10) comprises;

a lock hole (25) extending through the locking bar (7), wherein the lock hole (25) assumes, in the closed position, a direction mainly parallel to the door plane;

a house (11) fixed on the door (4) and having a channel (12), said house and channel enclosing the locking bar (7) and a bolt guide (22) which is in alignment with the lock hole (25) in the closed position; and a sliding bolt (23), characterized in that the sliding bolt (23) has a free end part provided with locking means (37); that this free end part, by sliding the slidable bolt (23) in the bolt guide (22), extends through the lock hole (25) being in a locking position, from one side of the locking bar (7) to the other side for locking the locking device (10) by engagement of the lock (18) placed on said other side of the locking bar (7), characterized in that the bolt (23) is provided with a head (24) at the end opposite to the lock (18) in the locked position, and in that a circular groove (45) is made in the bolt (23) close to the head (24), and in that the house (11) has an opening on one side of the channel (12) for taking up the lock (18), and that the bolt guide (22) ends on the other side of the channel (12).

2. A locking device (10) with a lock (18), for locking an already closed door (4) which is mounted with hinges (6) on a frame (5) in a wall closed position by a locking bar (7) which, at least at one end, has a projection for engaging the bar with a holder on the frame, wherein the locking device (10) comprises;

a lock hole (25) extending through the locking bar (7), wherein the lock hole (25) assumes, in the closed position, a direction mainly parallel to the door plane;

a house (11) fixed on the door (4) and having a channel (12), said house and channel enclosing the locking bar (7) and a bolt guide (22) which is in alignment with the lock hole (25) in the closed position; and a sliding bolt (23), characterized in that the sliding bolt (23) has a free end part provided with locking means (37); that this free end part, by sliding the slidable bolt (23) in the bolt guide (22), extends through the lock hole (25) being in a locking position, from one side of the locking bar (7) to the other side for locking the locking device (10) by engagement of the lock (18) placed on said other side of the locking bar (7), characterized in that the house (11) is composed of a bracket with a U-shaped channel (12), a mounting web (13) placed on each side of the channel (12), a sleeve (17) placed on one side of the channel (12) for taking up the lock (18), and a second sleeve (20) placed on the other side of the channel (12) with a bush (21) containing the bolt guide (22).

3. A locking device (10) according to claim 2, characterized in that a bracket (8) is placed on the door (4) for, by turning the locking bar (7), retaining the projection of this bar.

4. A locking device (10) according to claim 2, characterized in that the lock is a combination lock (18) having annular tumblers (27) with radially inwards turned tumbler keys (28), and that the locking means of the bolt (23) comprises a number of encircling grooves (37) for taking up the tumbler keys (28) when locking, a longitudinal free mortise (38) for taking up the tumbler keys (28) when unlocking, and a pawl (39) placed in the house (11) and engaging with the free mortise (38).

5. A locking device (10) according to claim 2, characterized in that the bolt (23) has a round cross-section with a diameter of between 0.7 and 0.05 times the diameter of the locking bar (7).

6. The locking device of claim 2 wherein the engagement of the lock is by means of the locking means (37) engaging tumblers (27) in the lock.

7. A locking device (10) according to claim 2 wherein the locking bar (7) engages the holder on the frame by a turning movement.

8. A locking device (10) according to claim 2 wherein the locking bar (7) is a cremone rod.

9. The locking device of claim 2 further comprising a breakable bolt seal (46) in a sealing hole (50), wherein the breakable bolt seal has two parts (47) and (48), and also comprising on the sliding bolt (23) a locking groove (51) and a head (24) at the end opposite to the lock (18) in the locked position, such that when the lock is in the locked position, the parts (47) and (48) can be joined irreversibly to form the breakable bolt seal (46), wherein the breakable bolt seal (46) operatively engages the sliding bolt (23) at the locking groove (51) to prevent the sliding bolt (23) from being withdrawn from the lock hole (25).

10. A locking device (10) according to claim 2, characterized in that the bolt (23) has a round cross-section with a diameter of between 0.6 and 0.1 times the diameter of the locking bar (7).

11. A locking device (10) according to claim 2, characterized in that the bolt (23) has a round cross-section with a diameter of between 0.5 and 0.2 times the diameter of the locking bar (7).

12. A locking device (10) according to claim 2, characterized in that the house (11) has an opening on one side of the channel (12) for taking up the lock (18), and that the bolt guide (22) ends on the other side of the channel (12).

13. A locking device (10) according to claim 2, characterized in that the bolt (23) is provided with a head (24) at the end opposite to the lock (18) in the locked position.

14. A locking device (10) with a lock (18), for locking an already closed door (4) which is mounted with hinges (6) on a frame (5) in a wall and is held in the closed position by a locking bar (7) which, at least at one end, has a projection for engaging the bar with a holder on the frame, wherein the locking device (10) comprises;

a lock hole (25) extending through the locking bar (7), wherein the lock hole (25) assumes, in the closed position, a direction mainly parallel to the door plane;

a house (11) fixed on the door (4) and having a channel (12), said house and channel enclosing the locking bar (7) and a bolt guide (22) which is in alignment with the lock hole (25) in the closed position; and a sliding bolt (23), characterized in that the sliding bolt (23) has a free end part provided with locking means (37); that this free end part, by sliding the slidable bolt (23) in the bolt guide (22), extends through the lock hole (25) being in a locking position, from one side of the locking bar (7) to the other side for locking the locking device (10) by engagement of the lock (18) placed on said other side of the locking bar (7), characterized in that the lock is a combination lock (18) having annular tumblers (27) with radially inwards turned tumbler keys (28), and that the locking means of the bolt (23) comprises a number of encircling grooves (37) for taking up the tumbler keys (28) when locking, a longitudinal free mortise (38) for taking up the tumbler keys (28) when unlocking, a pawl (39)placed in the house (11) and engaging with the free mortise (38), and characterized in that the free mortise (38) ends blindly in the bolt (23), and that the pawl (39), in the locked condition of the locking device (10), engages with the mortise (38) at a distance from the end of the mortise (38) closest to the lock (18).

15. A locking device (10) according to claim 14, characterized in that the house (11) has an opening on one side of the channel (12) for taking up the lock (18), and that the bolt guide (22) ends on the other side of the channel (12).

16. A locking device (10) according to claim 14, characterized in that the bolt (23) is provided with a head (24) at the end opposite to the lock (18) in the locked position.

17. A locking device (10) according to claim 14, characterized in that a bracket (8) is placed on the door (4) for, by turning the locking bar (7), retaining the projection of this bar.

18. A locking device (10) with a lock (18), for locking an already closed door (4) which is mounted with hinges (6) on a frame (5) in a wall and is held in the closed position by a locking bar (7) which, at least at one end, has a projection for engaging the bar with a holder on the frame, wherein the locking device (10) comprises;

a lock hole (25) extending through the locking bar (7), wherein the lock hole (25) assumes, in the closed position, a direction mainly parallel to the door plane;

a house (11) fixed on the door (4) and having a channel (12), said house and channel enclosing the locking bar (7) and a bolt guide (22) which is in alignment with the lock hole (25) in the closed position; and a sliding bolt (23), characterized in that the sliding bolt (23) has a free end part provided with locking means (37); that this free end part, by sliding the slidable bolt (23) in the bolt guide (22), extends through the lock hole (25) being in a locking position, from one side of the locking bar (7) to the other side for locking the locking device (10) by engagement of the lock (18) placed on said other side of the locking bar (7), characterized in that the lock is a combination lock (18) having annular tumblers (27) with radially inwards turned tumbler keys (28), and that the locking means of the bolt (23) comprises a number of encircling grooves (37) for taking up the tumbler keys (28) when locking, a longitudinal free mortise (38) for taking up the tumbler keys (28) when unlocking, a pawl (39)placed in the house (11) and engaging with the free mortise (38), and characterized in that the free mortise (38) ends at the free terminal surface of the bolt (23), and that the pawl (39) engages with the mortise at a distance from this terminal surface in the locked condition of the locking device (10), and that the house (11) has a sealing hole (50; 54) extending transversely to the bolt guide and serves for mounting of a seal (46; 53).

19. A locking device (10) with a lock (18), for locking an already closed door (4) which is mounted with hinges (6) on a frame (5) in a wall and is held in the closed position by a locking bar (7) which, at least at one end, has a projection for engaging the bar with a holder on the frame, wherein the locking device (10) comprises;

a lock hole (25) extending through the locking bar (7), wherein the lock hole (25) assumes, in the closed position, a direction mainly parallel to the door plane;

a house (11) fixed on the door (4) and having a channel (12), said house and channel enclosing the locking bar (7) and a bolt guide (22) which is in alignment with the lock hole (25) in the closed position; and a sliding bolt (23), characterized in that the sliding bolt (23) has a free end part provided with locking means (37); that this free end part, by sliding the slidable bolt (23) in the bolt guide (22), extends through the lock hole (25) being in a locking position, from one side of the locking bar (7) to the other side for locking the locking device (10) by engagement of the lock (18) placed on said other side of the locking bar (7), characterized in that the lock is a combination lock (18) having annular tumblers (27) with radially inwards turned tumbler keys (28), and that the locking means of the bolt (23) comprises a number of encircling grooves (37) for taking up the tumbler keys (28) when locking, a longitudinal free mortise (38) for taking up the tumbler keys (28) when unlocking, a pawl (39) placed in the house (11) and engaging with the free mortise (38), and characterized in that the free mortise (38) ends blindly in the bolt (23), and that the pawl (39), in the locked condition of the locking device (10), engages with the mortise (38) at a distance from the end of the mortise (38) closest to the lock (18), further comprising a prestressed spring positioned such that when the lock is unlocked, the spring pushes the bolt (23) in the direction opposite of the lock (18) until the pawl (39) hits the end of the mortise (38) and a head (24) on the bolt opposite the side engaging the lock projects from the house.

20. A locking device (10) with a lock (18), for locking an already closed door (4) which is mounted with hinges (6) on a frame (5) in a wall and is, held in the closed position by a locking bar (7) which, at least at one end, has a projection for engaging the bar with a holder on the frame, wherein the locking device (10) comprises;

a lock hole (25) extending through the locking bar (7), wherein the lock hole (25) assumes, in the closed position, a direction mainly parallel to the door plane;

a house (11) fixed on the door (4) and having a channel (12), said house and channel enclosing the locking bar (7) and a bolt guide (22) which is in alignment with the lock hole (25) in the closed position; and a sliding bolt (23), characterized in that the sliding bolt (23) has a free end part provided with locking means (37); that this free end part, by sliding the slidable bolt (23) in the bolt guide (22), extends through the lock hole (25) being in a locking position, from one side of the locking bar (7) to the other side for locking the locking device (10) by engagement of the lock (18) placed on said other side of the locking bar (7), and further comprising a breakable bolt seal (46) in a sealing hole (50), wherein the breakable bolt seal has two parts (47) and (48), and also comprising on the sliding bolt (23) a locking groove (51) and a head (24) at the end opposite to the lock (18) in the locked position, such that when the lock is in the locked position, the parts (47) and (48) can be joined irreversibly to form the breakable bolt seal (46), wherein the breakable bolt seal (46) operatively engages the sliding bolt (23) at the locking groove (51) to prevent the sliding bolt (23) from being withdrawn from the lock hole (25).

21. A locking device (10) according to claim 20, characterized in that the bolt (23) has a round cross-section with a diameter of between 0.6 and 0.1 times the diameter of the locking bar (7).

22. A locking device (10) according to claim 20, characterized in that the bolt (23) has a round cross-section with a diameter of between 0.5 and 0.2 times the diameter of the locking bar (7).

23. A locking device (10) according to claim 20, characterized in that the house (11) has an opening on one side of the channel (12) for taking up the lock (18), and that the bolt guide (22) ends on the other side of the channel (12).

* * * * *

UNITED STATES PATENT AND TRADEMARK OFFICE

CERTIFICATE OF CORRECTION

PATENT NO. : 6,442,982 B1
DATED : September 3, 2002
INVENTOR(S) : Larsen et al.

It is certified that error appears in the above-identified patent and that said Letters Patent is hereby corrected as shown below:

Column 6,
Line 28, after "wall" insert -- and is held in the --; and

Column 9,
Line 28, delete "," after "is".

Signed and Sealed this

Eleventh Day of February, 2003

JAMES E. ROGAN
*Director of the United States Patent and Trademark Office*